May 6, 1941.  E. E. HAGELINE  2,240,888
MILK SAMPLER APPARATUS
Filed April 21, 1938  4 Sheets-Sheet 1

Inventor:
Emil E. Hageline.

May 6, 1941.  E. E. HAGELINE  2,240,888
MILK SAMPLER APPARATUS
Filed April 21, 1938    4 Sheets-Sheet 2

Inventor:
Emil E. Hageline,

May 6, 1941.  E. E. HAGELINE  2,240,888
MILK SAMPLER APPARATUS
Filed April 21, 1938  4 Sheets-Sheet 3

Fig. 4.

Fig. 5.

Inventor:
Emil E. Hageline,
By Chritton, Wiles, Davies, Hinkell & Dawson, Attys.

May 6, 1941.　　　E. E. HAGELINE　　　2,240,888
MILK SAMPLER APPARATUS
Filed April 21, 1938　　　4 Sheets-Sheet 4
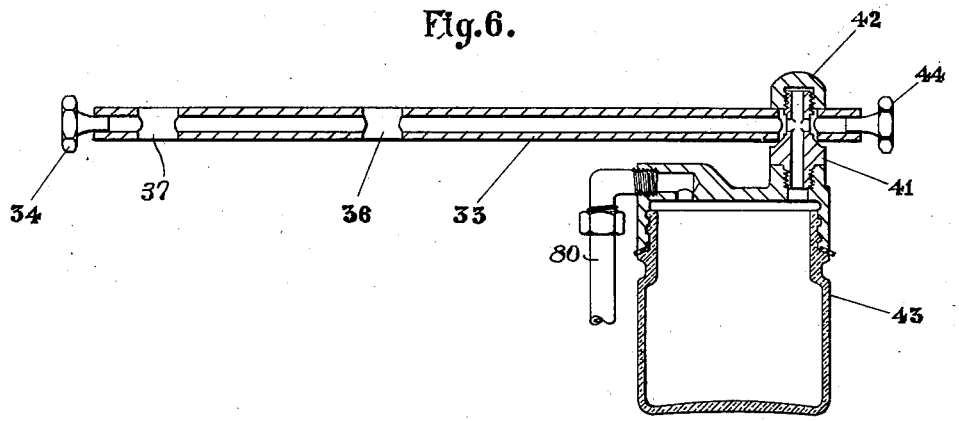
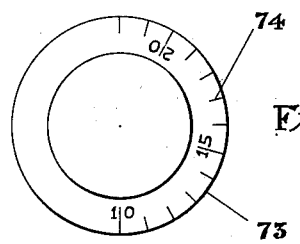
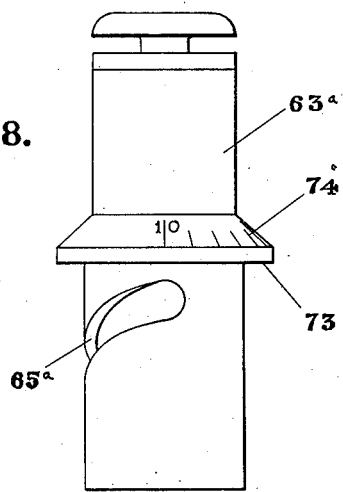
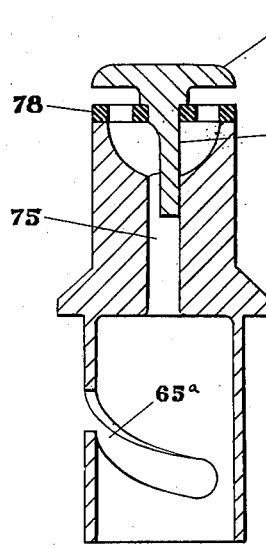
Inventor:
Emil E. Hageline, Patented May 6, 1941

2,240,888

UNITED STATES PATENT OFFICE 2,240,888

MILK SAMPLER APPARATUS

Emil E. Hageline, Chicago, Ill., assignor to The Lathrop-Paulson Company, Chicago, Ill., a corporation of Illinois Application April 21, 1938, Serial No. 203,402

15 Claims. (Cl. 73—21)

This invention relates to milk sampler apparatus. It is obvious, however, that the apparatus is adapted for sampling other types of liquids and for other uses.

An object of the invention is to provide simple and effective apparatus by which an accurately representative sample of milk or other fluid is obtained. A further object is to provide means by which a sample may be selected from a plurality of sources and a measured quantity quickly recovered in a container. A further object is to provide means whereby the operator may vary the quantity desired for the sample. Other specific objects and advantages will appear as the specification proceeds.

The invention is illustrated, in a preferred embodiment, by the accompanying drawings, in which—

Figure 1:
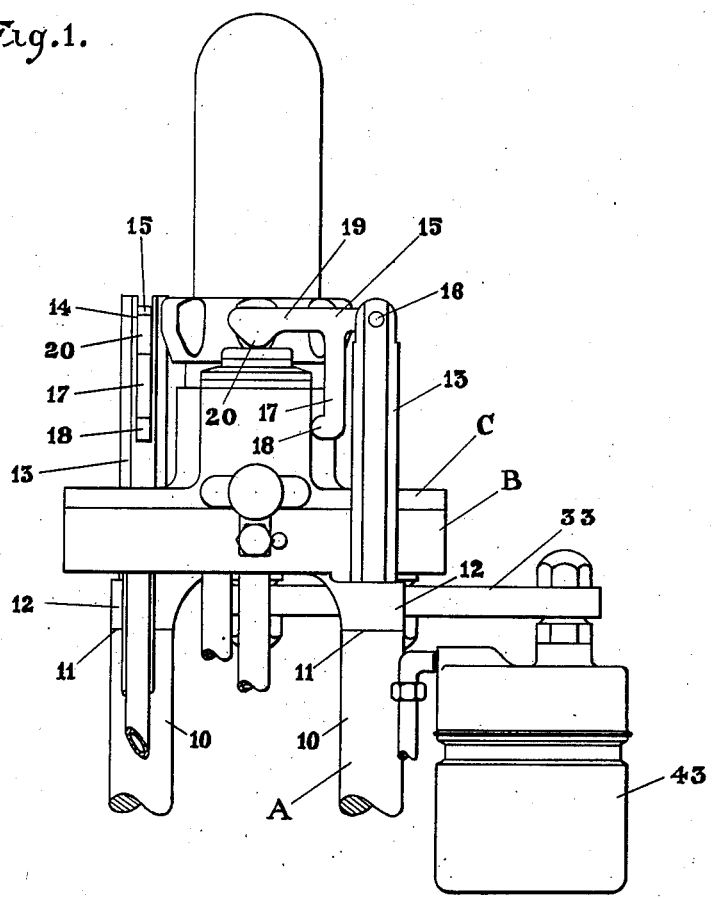
Figure 2:
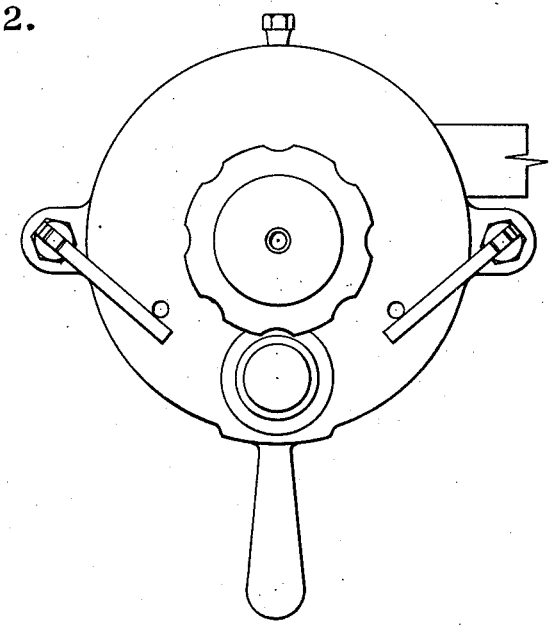
Figure 3:
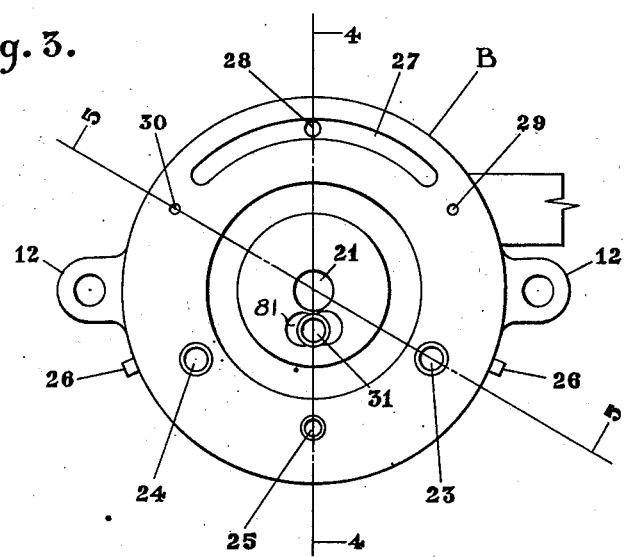

Figure 1 is a broken front elevational view of apparatus embodying my invention; Fig. 2, a top plan view; Fig. 3, a plan view of the lower disk; Fig. 4, a transverse sectional view, the section being taken as indicated at line 4 of Fig. 3, the upper and lower disks being shown in neutral position; Fig. 5, a view similar to Fig. 4, the upper disk, however, being swung to one side and the section being taken as indicated at line 5 of Fig. 3; Fig. 6, a longitudinal sectional view of the vapor trap and vacuum conduit communicating with the lower disk; Fig. 7, a plan view of a modified form of a sample-measuring device to be received within the sample chamber; Fig. 8, a view in elevation of the same; and Fig. 9, a vertical sectional view of the structure shown in Figs. 7 and 8.

In the illustration given, A designates supporting apparatus; B, the lower disk; and C, the upper disk.

The supporting apparatus A may be of any suitable construction. In the illustration given, it consists of two tubular shafts 10 which are anchored at the lower ends to a device, such as a stand or cabinet (not shown). The supports 10 are reduced to provide shoulders 11 which engage and support the ears 12 with which the lower plate B is provided. The reduced ends 13 of the supports 10 extend through the perforated ears 12 and at their top ends are cut away to provide U-shaped slots 14. Within each of the slots 14 is received an actuating arm 15. Each actuating arm 15 is secured within the slot 14 by means of a pin 16. Each of the actuating arms 15 is provided with a depending arm member 17 equipped with a forward contact extension 18 and with a horizontal arm 19 provided with a downwardly extending presser foot 20. Each of the actuator arms 15 is employed for actuating a sampler valve, as will be hereinafter described.

The lower disk B may be of any suitable construction. As already stated, it is provided with integral ears 12 which are supported upon standards 10. The disk B is centrally apertured at 21 to rotatably receive a depending cylindrical pivot extension 22 formed integrally with disk C. Upon pivot 22, the upper disk C is free to rotate with its lower adjacent face portion bearing against the upper face of disk B.

The lower plate B is provided with a plurality of openings for connection with the milk tanks below, with a sampler chamber, with a suction pipe, and with the atmosphere. As shown more clearly in Figs. 3, 4 and 5, the plate B is provided with a pair of openings receiving the milk tubes 23 and 24. At a point midway between tubes 23 and 24 is the liquid outlet tube 25 through which the sample of milk or other liquid passes into the sample container. Adjacent each of the milk inlet openings 23 and 24 are stop lugs 26 which serve to align holes carried by the upper disk C with the milk tubes 23 and 24. The lugs project laterally from the sides of the plate B. When the upper disk C is rotated to a position in which the opening in the upper disk is aligned with one of the milk tubes 23 or 24, the lower portion of the handle 46 strikes one of the lugs and the rotation is stopped. At the rear of the plate B is an arcuate groove 27 which is provided centrally with an opening 28 communicating with the atmosphere. Thus, the groove 27 is constantly in communication with the atmosphere. Spaced from the ends of the slot 27 are vacuum openings 29 and 30 through which suction is applied for drawing the liquid through tubes 23 and 24, as will be later described. The plate B is provided also with a drain tube 31 which is located toward the center of the plate and through which liquid may be drained after each operation back into the tanks below. The drain tube 31 communicates at its upper end with a recess or groove 81. Plate B is preferably provided at its front side with a locking depression 32.

Any suitable means for applying suction to the openings 29 and 30 of plate B may be employed. In the illustration given, I provide a rectangular tube 33 which is closed at its inner end by taper plug 34 and provided at spaced intervals with hollow fittings 36 and 37. Fittings 36 and 37 each consist of a rivet-like member extending through the tube 33 and provided with an opening communicating with the interior of tube 33. The fitting 37, as shown more clearly in Fig. 5, extends through the member 33 and is threadedly connected at 38 to the lower plate B. The fitting 37 is provided with a passage 39 communicating with the passage 30 of plate B. The lower threaded end of the member 37 is engaged by a closure cap 40 which seals the opening. In this manner, a tight seal is effected between the hollow vacuum tube 33 and plate B so that the tube communicates with the opening 30. The vacuum tube 33 is similarly connected through the fitting 36 with the opening 29. The tube 33 communicates at its rear side through a similar fitting 41 and closure cap 42 with the interior of the vapor trap 43. The end of tube 33 adjacent the fitting 41 is closed by the taper plug 44. A vacuum reduced line 80 leads from the upper portion of the trap 43 to a source of vacuum (not shown).

The upper disk C may be of any suitable construction. In the illustration given, the disk C is provided with a central downwardly extending pivot portion 22 received within the opening 21 of plate B whereby the upper disk may rotate upon the lower fixed disk. If desired, portions of the lower disk may be cut away as at 45, as well as in other portions, to reduce the friction of the parts. The upper disk is provided with a handle extension 46 and below the handle is a spring-pressed pin 47 adapted to engage the depression 32 when the handle is swung to central or neutral position. The central portion of the disk C is provided with a vertical passage 48 which is closed at its lower end by plug 49. A tube 50 is secured within the passage 48 and extends well thereabove. Above the passage 48 is secured a glass tube member 51 through which the liquid drawn into the chamber becomes visible. An airtight seal is formed with the inverted glass member 51, as shown more clearly in Figs. 4 and 5. A rubber sealing member 52 is secured and held against the member 51 by means of a loose ring 53 and a lock nut 54, the nut 54 engaging a threaded central extension portion 55 of disk C.

The plate C is provided along its rear side with a horizontal passage 56 which is closed by plug 57 and which is provided with a downwardly extending opening 58. The horizontal passage 56 communicates with the vertical central passage 48, and the downward extending passage 58 is adapted to communicate with the groove 27 open to the atmosphere as well as with the suction openings 29 or 30, depending upon the position of the upper disk C.

Communicating with the lower portion of the chamber formed by the glass member 51 and extending through the disk C is a vertical liquid passage 59. Liquid passage 59 communicates with the liquid drain pipe 31 when the upper disk C is swung to the position illustrated in Fig. 4. The passage 59 also is provided with an upwardly inclined passage 60 which communicates with the sample chamber, as shown more clearly in Fig. 5.

The sample chamber may be of any suitable type or construction. In the illustration given, I form a recess or well 61 in plate C adjacent the handle 46. On one side of the well, I provide a vertical groove 62, the vertical groove 62 communicating with the upwardly inclined passage 60. Within the well 61 I place a cylindrical member 63 which is preferably cut away at its lower end to provide a sample chamber 64. The cylindrical member 63 is provided on one side with a horizontal passage 65 which is in alignment with the vertical slot 62 of the disk C. Mounted for vertical movement within the central bore 66 of the member 63 is a valve member 67. The valve member is provided at its lower end with a hollow portion 68 having an opening 69 in one side thereof and adapted to be brought into alignment with the transverse passage 65. The valve member is provided on one side with a guide flange 70. The valve 67 is preferably provided at its upper side with a head 71 which is urged toward raised position by a perforated rubber disk 72 having a solid rim portion. When the disk is depressed, as shown in Fig. 5, the cap 71 forms with the rubber disk 72 a tight seal.

In the modification shown in Figs. 7, 8, and 9, I substitute for the cylinder 63 a member 63$^a$ which is provided on its lower side with a spiral slot 65$^a$. At a point adjacent the top is a flange 73 provided with graduations 74. At its upper end, the member 63$^a$ is provided with a guide slot 75 receiving the guide stem 76 formed integrally with the valve member 77. A perforated rubber cylindrical member 78 normally urges the valve member toward raised or open position. With this construction, the operator may, by rotating the member 63$^a$, bring the slot 65$^a$ into alignment with the groove 62 of the member C at any height, thereby regulating the amount of the sample to be taken, as will be more fully described hereinafter.

*Operation*

In the operation of the device, the upper disk C is in the initial position illustrated in Fig. 4, being releasably held in this position by the plunger 47 which engages depression 32. The handle may now be swung to either the right or the left to draw liquid through either of the tubes 23 or 24. Thus, with a divided milk tank of the usual construction located below the sampler and with tube 23 extending into one of the tanks and tube 24 extending into the other, the operator may select a sample from either of the tanks. Assuming, for the purpose of illustration, that the handle is swung to the right so as to bring the tube 23 into alignment with the opening 64$^a$ in the bottom portion of the sample chamber, liquid is now free to flow upwardly into the sampler chamber if sufficient suction is applied. The suction is applied in this manner. The valve member 67 is first closed, as illustrated in Fig. 5, as the handle is swung to the right by means of contact between the actuator arm 15 and the head 71 of the valve. As the disk is swung to the right, the extension 18 of the vertical lever 17 engages the cylindrical portion of casing C forming a housing for the well 61 and swings rearwardly, this movement serving to force the horizontal portion 19 downwardly so as to bring the presser foot 20 against the cap 71 of the valve. The result is a downward movement of the cap 71 effecting the air closure with the rubber sealing member 72, as illustrated in Fig. 5.

At the same time, the opening 58 communicating with the horizontal passage 56 of disk C is brought into registry with the vacuum opening 30 of plate B whereby suction is applied through passage 30, passage 39 of fitting 37, and thence through the opening 37$^a$ and the hollow tube 33 to the vapor trap 43, which is maintained under partial vacuum by connection with the suction line 80. By this means, the vertical hole 48 and the chamber within the glass enclosure 51 is brought under partial vacuum, and this partial vacuum also extends through the vertical hole 59, inclined passage 60, and the vertical groove 62. Upon the depression of valve 67, the opening 69 in the lower portion thereof is brought into alignment with the horizontal passage 65, thus establishing open communication with the sample chamber, the visual chamber provided by member 51, and the lines 48 and 56. Liquid flows through pipe 23 into the sample chamber and thence upwardly through the passage 68, horizontal passage 65, groove 62, downwardly inclined passage 60, upwardly through passage 59 into the visual chamber where the amount drawn in is indicated by the liquid level.

Before the liquid reaches the top of tube 50, the handle 46 is swung back to the original position shown in Fig. 4. In this position, the valve 67 swings back to its original position, as shown in Fig. 4; the horizontal line 56 is brought into communication with the groove 27 and the atmosphere passage 28. Likewise, the liquid passage 59 is brought into alignment with the recess or groove 81 communicating with the drain pipe 31 which allows the liquid to flow from the visual chamber back into the tank. Likewise, liquid flows from the groove 62 downwardly into the tank. The release of valve 67, so that it springs back to the position shown in Fig. 4, at the same time closes the horizontal passage 65 so that no liquid can flow into the sample valve. The quantity of liquid within the sample valve, which is a measured quantity, now is free to flow under atmospheric pressure downwardly and outwardly through the sample pipe 25 with which the bottom opening 64ᵃ of the chamber has been brought into alignment.

The handle 46 may now be swung to the opposite side to bring the sample chamber into alignment with the liquid pipe 24, and the vacuum opening 58 is brought into alignment with the opening 29. In this position, the operation is as already described.

In the foregoing operation, it will be noted that the incoming milk has to pass through the sample chamber and thus it sweeps away any and all of the milk contained therein from the sample, the old milk being carried upwardly into the visual chamber from which it drains later back into the tank. Thus, it will be seen that the sample actually taken is an accurate sample of the tank and does not contain any remnants from the sample taken just before.

By means of the vapor trap 43, connected as described, any milk which might be caused to overflow into the pipe 50 is prevented from reaching the suction apparatus.

In order to fill the visual chamber evenly and smoothly and to prevent any disturbance therein which might cause liquid to reach the tube 50, I provide tube 50 near its lower portion with a circular baffle 79 which is spaced at its outer edges from the wall of the casing 55 which allows liquid to feed evenly and smoothly into the chamber thereabove.

With the apparatus described in Figs. 1 to 6 inclusive, the sample taken is of a fixed quantity in each operation. If a varied quantity is desired, the devices shown in Figs. 7 to 9 inclusive may be substituted for the member 63 and associated parts. With this structure shown in Figs. 7 to 9 inclusive, the operator can rotate the member 63ᵃ until one of the graduations is aligned with the central part of the handle, thus indicating the quantity which will be retained in the sample chamber. This quantity is determined by the spiral slotway 65ᵃ. If the top portion of the slot is aligned with the groove 62, then a large sample will be retained. If the bottom portion of the slotway 65ᵃ is aligned with the groove 62, then a small sample will be retained. In the operation of the device with the variable controlling member shown in Figs. 7 to 9 inclusive, it is preferred to bring the disk C to a stop momentarily as it is swung from an outer position toward the center or neutral position. This allows the liquid within the visual chamber and also within the groove 62 to drain away, thus leaving the proper level within the sample chamber. The disk is then swung slightly forward to neutral position, at which point the sample is recovered.

Because of the arrangement of the groove 27 a slight movement of the disk C towards neutral position is sufficient to bring the horizontal line 56 into communication with the atmosphere passage 28. The recess or groove 81 is of such length that it will be brought into communication with the passage 59 whenever the line 56 is opened to the atmosphere through the groove 27. This permits the draining of the visual chamber 51 and the groove 62 during the momentary stop of the disk C referred to above.

While in the foregoing description, I have set forth certain specific details and steps of operation, it will be obvious that considerable variation may be made in these without departing from the spirit of my invention.

The foregoing detailed description has been given for clearness of understanding only, and no unnecessary limitations should be understood therefrom.

I claim:

1. In a device of the class described, a pair of disks rotatably mounted one on the other with portions of the adjacent faces in contact, one of said disks being provided with a sample chamber, conduit means in said disks whereby upon rotation of one of said disks to one position the said chamber is in open communication with a liquid conduit and when rotated to another position the chamber is in open communication with a drain conduit, and means for drawing liquid into said chamber when in the said first position.

2. In a device of the class described, a pair of disks rotatably mounted one on the other with portions of their adjacent faces in contact, one of said disks being provided with a sample chamber, conduit means in said disks whereby upon rotation of one of said disks to one position the said chamber is in open communication with a liquid conduit and when rotated to another position the chamber is in open communication with a drain conduit, means for drawing liquid into said chamber when in the said first position and, means for allowing it to flow from said chamber when the disk is moved to said second position.

3. In a device of the class described, a pair of members rotatably mounted one on the other with portions of their adjacent faces in contact, one of said members being provided with a vacuum chamber and with a sample chamber communicating with said vacuum chamber, liquid and vacuum conduit means in said disks, said means being adapted, upon rotation of one of said disks to one position, to permit liquid to be drawn through said sample chamber and into said vacuum chamber and said means being further adapted, upon movement of said disk to a second position, to permit liquid to be drawn from said vacuum chamber through one conduit and liquid to be drawn from said sample chamber through another conduit.

4. In a device of the class described, a pair of disks rotatably mounted one on the other with portions of their adjacent faces in contact, one of said disks being provided with an eccentrically located sample chamber, conduit means in said disks whereby upon rotation of one of said disks to one position the said chamber is in open communication with a liquid conduit and to another position when the chamber is in open communication with a drain pipe, and means for drawing liquid into said chamber when in the said first position.

5. In a device of the class described, a stationary disk and a second disk rotatably mounted thereon, said second disk being provided with a sample chamber and with a vacuum chamber, conduit means in said disks whereby upon rotation of said second disk to one position the said sample chamber and vacuum chamber are in open communication with a liquid conduit and when moved to another position the said chambers are in open communication with separate conduits, and means for connecting said vacuum chamber with a source of suction when said vacuum chamber is brought into said first-mentioned position.

6. In a device of the class described, a pair of disks rotatably mounted one on the other with portions of their adjacent faces in contact, one of said disks being provided with a sample chamber, a valve for alternately sealing said chamber and venting it to the atmosphere, conduit means in said disks whereby upon rotation of one of said disks to one position the said chamber is in open communication with a liquid conduit and to another position the chamber is in open communication with a drain conduit, and means for creating suction within said chamber when said valve seals the same.

7. In apparatus of the class described, a disk member fixedly supported, a second disk rotatably mounted thereon, a sample chamber carried by said second disk, a vacuum chamber carried by said second disk, said vacuum chamber being provided with a vertical tube extending thereinto, conduit means connecting said vacuum chamber and said sample chamber, valve means for sealing said sample chamber and for venting the same to the atmosphere, said disks being provided with conduits whereby upon moving said second disk to one position, said sample chamber and said vacuum chamber are placed in communication with a liquid pipe and said vacuum chamber is placed in communication with a source of suction, said conduits permitting liquid to flow separately from said vacuum chamber and said sample chamber when said disk is swung to another position and said sample chamber is vented to the atmosphere.

8. In apparatus of the class described, a disk member fixedly supported, a second disk rotatably mounted thereon, a sample chamber carried by said second disk, a vacuum chamber carried by said second disk, said vacuum chamber being provided with a vertical tube extending thereinto, conduit means connecting said vacuum chamber and said sample chamber, valve means for sealing said sample chamber and for venting the same to the atmosphere, said disks being provided with conduits whereby upon moving said second disk to one position, said sample chamber and said vacuum chamber are placed in communication with a liquid pipe and said vacuum chamber is placed in communication with a source of suction, said conduits permitting liquid to flow separately from said vacuum chamber and said sample chamber when said disk is swung to another position and said sample chamber is vented to the atmosphere, said tube within said vacuum chamber being provided with a baffle in the lower portion of the chamber.

9. In apparatus of the class described, a disk member fixedly supported, a second disk rotatably mounted thereon, a sample chamber carried by said second disk, a vacuum chamber carried by said second disk, said vacuum chamber being provided with a vertical tube extending thereinto, conduit means connecting said vacuum chamber and said sample chamber, valve means for sealing said sample chamber and for venting the same to the atmosphere, said disks being provided with conduits whereby upon moving said second disk to one position, said sample chamber and said vacuum chamber are placed in communication with a liquid pipe and said vacuum chamber is placed in communication with a source of suction, said conduits permitting liquid to flow separately from said vacuum chamber and said sample chamber when said disk is swung to another position and said sample chamber is vented to the atmosphere, said disks being provided with stops whereby said disks may be accurately halted in the desired positions.

10. In apparatus of the class described, a disk provided with a sample well, said well being provided on one side with a vertical groove, a cylindrical member received within said well and rotatable therein, said cylindrical member being provided with an inclined slot adapted to be brought into communication with said vertical groove, and valve means for alternately sealing and venting said well to the atmosphere.

11. In apparatus of the class described, a disk provided with a sample well, said well being provided on one side with a vertical groove, a cylindrical member received within said well and rotatable therein, said cylindrical member being provided with an inclined slot adapted to be brought into communication with said vertical groove, and valve means for alternately sealing and venting said well to the atmosphere, said disk being provided with a downwardly inclined drain passage communicating with said vertical groove.

12. In a device of the class described, a disk providing a sample well, said well being provided with an outlet passage, a removable cylinder received within said well and provided with a passage therethrough communicating with said outlet passage from the well, a valve member supported for vertical movement and adapted to close and open said passage leading through said cylinder, said valve being provided with a cap, and a resilient rubber seal provided with perforations normally urging said cap in an upward direction and serving to seal said cylinder in the well when said cap is pressed downwardly in contact therewith.

13. In combination with a stationary disk and a rotatably mounted disk, said disks having portions of their adjacent faces in contact, a sample chamber carried by said rotatably mounted disk and provided with passages adapted to communicate with a passage in said stationary disk, a valve member mounted in said sample chamber, means urging said valve towards one position, and automatic means for actuating said valve when said disk is swung to one position.

14. In combination with a stationary disk and a rotatably mounted disk, said disks having portions of their adjacent faces in contact, a sample chamber carried by said rotatably mounted disk and provided with a passage adapted to successively communicate with a plurality of passages in said stationary disk when said rotatably mounted disk is moved to proper position, a valve member mounted in said sample chamber, means urging said valve towards one position, and automatic means for actuating said valve when said disk is swung to one position, said means for urging the valve toward one position comprising a rubber disk provided with perforations therein, said disk having a solid rim portion adapted to effect an airtight seal for said chamber when said valve is pressed thereagainst.

15. In a device of the class described, a casing, said casing being provided with a visual vacuum chamber and with a sample chamber, a valve-controlled passage connecting the upper portion of said sample chamber with said visual vacuum chamber, separate drain pipes adapted to be connected to each of said chambers, a liquid inlet pipe communicating with a container of liquid and adapted to be connected to the bottom of said sample chamber, a vacuum line communicating with said vacuum chamber, valve means controlling said vacuum line and said liquid inlet pipe, said vacuum line being provided with a liquid trap, and means for connecting said drain pipes to said chambers when the vacuum line and liquid inlet pipe are shut off by said valve means.

EMIL E. HAGELINE.